United States Patent [19]

Kolb, deceased et al.

[11] Patent Number: 4,510,302

[45] Date of Patent: Apr. 9, 1985

[54] FORMULATIONS AND THEIR USE FOR PIGMENTING AND/OR DELUSTRING DRESSING AGENTS FOR LEATHER AND LEATHER IMITATIONS

[75] Inventors: Günter Kolb, deceased, late of Leverkusen, by Ingeborg Kolb, heiress; Leo Tork, Leverkusen; Wolfgang Höhne, Bergisch-Gladbach, all of Fed. Rep. of Germany

[73] Assignee: Bayer Aktiengesellschaft, Leverkusen, Fed. Rep. of Germany

[21] Appl. No.: 459,006

[22] Filed: Jan. 18, 1983

[30] Foreign Application Priority Data

Feb. 4, 1982 [DE] Fed. Rep. of Germany ....... 3203817

[51] Int. Cl.³ .................... C08F 220/12; C08F 226/10
[52] U.S. Cl. .................... 526/264; 428/473; 428/522; 524/548
[58] Field of Search .......... 524/548; 526/264

[56] References Cited

U.S. PATENT DOCUMENTS

| | | | |
|---|---|---|---|
| 2,828,223 | 3/1958 | McWherter et al. | 524/548 |
| 2,828,224 | 3/1958 | Alps | 524/548 |
| 3,405,084 | 10/1968 | Bohac et al. | 524/548 |
| 3,532,662 | 10/1970 | Ansdell | 524/923 |
| 3,806,464 | 4/1974 | Matrick et al. | 523/205 |
| 4,137,392 | 1/1979 | Gross | 526/264 |
| 4,332,860 | 6/1982 | Heins et al. | 524/547 |

FOREIGN PATENT DOCUMENTS

1540020 9/1968 France .
2179115 11/1973 France .

*Primary Examiner*—Harry Wong, Jr.
*Attorney, Agent, or Firm*—Sprung Horn Kramer & Woods

[57] ABSTRACT

Formulations containing pigments and/or delustrants, a solution of a pigment binder and, if appropriate, additives, characterized in that the pigment binder is a copolymer of, relative to the weight of the copolymer, 10–40% by weight of an acrylic acid ester having 1–12 C atoms in the alcohol chain,
10–40% by weight of a methacrylic acid ester having 1–4 C atoms in the alcohol chain,
10–30% by weight of N-vinylpyrrolidone,
5–15% by weight of acrylic acid and
10–20% by weight of a vinyl ester having 1–4 C atoms in the acid chain, which have been prepared in an organic solvent which is miscible with water in the presence of a regulator and of a per-compound or an azo compound which donates free radicals at the polymerization temperature, and the use of these formulations for pigmenting and/or delustring dressing agents for leather and leather imitations.

4 Claims, No Drawings

FORMULATIONS AND THEIR USE FOR PIGMENTING AND/OR DELUSTRING DRESSING AGENTS FOR LEATHER AND LEATHER IMITATIONS

The invention relates to new formulations of pigments and/or delustrants and their use for pigmenting and/or delustring dressing agents for leather and leather imitations. These dressing agents can be in the form of aqueous solutions, aqueous dispersions or also in solvents which are miscible with water.

It is known to colour dressing agents for leather or leather imitations by means of pigment formulations. These dressing agents can have been built up on the basis of casein, polyacrylates, butadiene polymers or polyurethanes. In addition to pigments and conventional finishing additives for dispersing pigments and stabilising pigment formulations, the pigment formulations contain either emulsifiers which do not form films or film-forming binders such as casein, vinylpyrrolidone/vinyl acetate copolymers or polymers containing carboxyl groups. For special applications, mixtures of emulsifiers and film-forming binders with a protective colloid effect can also be incorporated. Pigment formulations of this type adversely affect the properties of dressing agents for leather and the properties of the finished goods. If emulsifiers are used to disperse the pigments, admittedly highly-concentrated pigment formulations can be prepared, but it is a disadvantage that emulsifiers migrate through the leather dressing. The handle of the finished goods becomes tacky, and they tend to stick together. The fastness properties of the leather, such as, for example, fastness to wet and dry rubbing, wet cracking and wet adhesion are impaired, and the hot-processability and embossability are adversely effected. Finishes are also rendered soft in an uncontrolled manner. Leathers which are intended to have hydrophobic properties or leathers which swell in an unsightly way on strong wetting of the grain layer cannot be dressed by means of such pigment formulations. Such pigment formulations also tend on storage to deposit the pigments with the formation of a solid sediment which cannot be stirred up. If film-forming binders are used to disperse the pigments, the dressing agents are generally adjusted to be harder. They strain the grain layer, and produce a cracked grain appearance and poor grain definition. The wet rubbing fastness properties, the resistance to cracking, the cold cracking resistance and the wet adhesion are also impaired. These pigment binders cannot be used to prepare highly concentrated pigment formulations, since large amounts of binder are necessary to disperse the pigments and not only casein but also the copolymers mentioned act in a highly viscosity-increasing manner. Even small amounts of these relatively low-concentration pigment dispersions markedly increase the viscosity of a ready-for-application dressing liquor. The result is poor wet adhesions and poor wet cracking properties of dressing layers. These disadvantages can only be prevented if the viscosity of the liquors is reduced by diluting with water and a reduction in the solids content is thus brought about. However, this is associated at the same time with an increase in the number of applications of paste for a comparable dressing effect. If casein is used as the pigment binder, the wet fastness properties can also be improved by fixing the individual dressing layers by means of formaldehyde after each application of paste. This leads to a further process step and to the dressing becoming brittle, and is physiologically and ecologically not innocuous.

Plasticisers which can be added to reduce the hardening described, for example Turkey Red oils, polyglycols or caprolactam, migrate and just like emulsifiers render the dressing agents and the finished goods uncontrollably soft and tacky.

Even a combination of emulsifiers and film-forming binders does not eliminate the defects discussed. In every case, the high amounts of binder which are necessary critically affect the character of the dressing, so that it is necessary to use for each dressing a pigment formulation which has been exactly adjusted according to type and amount.

Frequently it is desirable subsequently to cross-link leather dressings with suitable agents to improve the fastness properties. Since such a crosslinking of the molecular chains frequently takes place in a weakly acidic medium, the pigment formulations used should be usable not only in an alkaline medium but also in a weakly acidic medium.

The need therefore existed for highly concentrated pigment formulations which have a long shelf life and can be universally used in water in a weakly acid and alkaline medium or in inorganic solvents which are miscible with water. They should have good flow properties and be easily processable, and it should be possible to prepare them by means of a small technical effort. These pigment formulations should also contain low amounts of binder and not have the disadvantages of known binders.

The present invention relates to formulations containing pigments and/or delustrants, a solution of a pigment binder and, if appropriate, additives, characterised in that the pigment binder is a copolymer of, relative to the weight of the copolymer, 10–40% by weight of an acrylic acid ester having 1–12 C atoms in the alcohol chain, 10–40% by weight of a methacrylic acid ester having 1–4 C atoms in the alcohol chain, 10–30% by weight of N-vinylpyrrolidone, 5–15% by weight of acrylic acid and 10–20% by weight of a vinyl ester having 1–4 C atoms in the acid chain, which have been prepared in an organic solvent which is miscible in water in the presence of a regulator and of a per-compound or an azo compound which donates free radicals at the polymerisation temperature. 0.2–2.5% by weight of regulator and 0.3–5% by weight of per-compound or azo compound which donates the radicals are preferably used in preparing the copolymer.

Possible examples of per-compounds are diacyl peroxides, per esters and per ketones, and an example of an azo compound which donates free radicals is azodiisobutyrodinitrile.

The regulators used are preferably sulphur compounds, such as mercaptoethanol, dodecylmercaptan or tert.dedecylmercaptan. Examples which may be mentioned of acrylic acid esters having 1–12 C atoms in the alcohol chain are acrylic acid methyl ester, acrylic acid ethyl ester, acrylic acid isopropyl ester, acrylic acid tert.butyl ester and acrylic acid n-butyl ester.

Examples which may be mentioned of methacrylic acid esters having 1–4 C atoms in the alcohol chain are methacrylic acid methyl ester, methacrylic acid ethyl ester and methacrylic acid isopropyl ester. Possible examples of a vinyl ester having 1–4 C atoms in the acid component are vinyl acetate and vinyl propionate.

Preferable copolymers have an intrinsic viscosity [η] of 0.05–0.35, and are prepared in, for example, ethylene glycol, methylglycol or ethylglycol or their acetates or mixtures thereof. The copolymers can be used as such in organic media, but they are preferably used in the form of their aqueous-alkaline or also neutral or weakly acidic solution.

The new formulations can also contain additives such as standardising agents and thickeners. Unlike conventional formulations, they can be prepared in a simple manner in a very short time by dispersing the components in a wet comminution apparatus, for example a rotor-stator mill, a bead mill or a ball mill. The particle size is about 0.2–2μ.

The pigments which have been incorporated in pigment formulations according to the invention are virtually free of any restriction, and can be of the inorganic or organic kind. Examples of suitable organic pigments are those of the azo, anthraquinone, azoporphine, thioindigo, dioxazine, naphthalenetetracarboxylic acid or perylenetetracarboxylic acid series and laked dyestuffs, such as Ca, Mg or Al lakes of dyestuffs containing sulphonic acid and/or carboxylic acid groups, of which a large number are known, for example from the Colour Index, 2nd edition. Examples of suitable inorganic pigments or lustrants are zinc sulphides, titanias, ultramarine blue, iron oxides, nickel compounds, chromium compounds, carbon black and silicas or aluminas.

Aqueous leather dressings which can be coloured with pigment formulations according to the invention have been described, for example in Ullmanns Encyklopädie der technischen Chemie [Ullmann's Encyclopaedia of Industrial Chemistry], 4th edition, volume 16, pages 161–163.

Virtually any dressing agent for leather or leather imitations which is based on acrylate, butadiene, vinyl chloride or polyurethanes, which usually exist as aqueous dispersions, can be pigmented with pigment formulations according to the invention.

The pigments are chosen according to the colour effect desired. If great hiding power is desirable, formulations of inorganic pigments are preferably used. If, on the other hand, the treated substrate is to display a transparent shade of high brilliance, formulations containing organic pigments are preferably used. A reactional use also allows for the fastness properties given by the pigment, such as light and migration fastness as well as thermostability. If more or less delustred dressing layers are aimed at, delustring pastes, for example based on silica or alumina, are used.

Formulations according to the invention have the advantage over casein colour pastes in that, despite a high pigment concentration, they have good flow and can be easily handled, they do not harden the dressing and they do not impair the wet strength of the dressing. Compared with pigment pastes which have been prepared with the addition of emulsifiers, they have the advantage that disadvantages associated with the migration of plasticisers do not arise and that the pigment pastes have longer shelf lives, in other words: do not tend to deposit a solid sediment which cannot be stirred up. By comparison with known film-forming polymer binders, they have the advantage that considerably lower amounts are necessary to achieve the same colour effect, and thus avoid an adverse change in the properties of the dressing agents.

It is an essential feature of the invention that the components which are mainly responsible for the dispersing and protective colloid properties, namely acrylic acid and N-vinylpyrrolidone, can be combined in the ratios mentioned. This fact has made it possible to prepare pigment pastes which are very highly concentrated and, nevertheless, can be processed easily and rapidly. It has also become possible to use these pigment pastes for cross-linkable special dressings which require a weakly acid pH value. Rising fastness requirements placed on dressing agents and the trend to work as far as possible only with aqueous liquors have led to pigmented effect colours containing aqueous binders based on a casein polymer binder. However, such effect colours extensively strain the grain, do little to emphasise grain definition and are not sufficiently brilliant. Pigment formulations according to the invention make it possible to prepare highly pigmented dressing agents which can be diluted with water in any ratio. They make it possible, for the first time in leather dressings, to give pronounced emphasis to grain formation without straining the grain.

Formulations according to the invention, of pigments and/or delustrants, thus combine the advantages of known formulations without having their disadvantages.

The fact that it is possible in this way to prepare highly concentrated pastes which can still be easily handled has also made it possible to colour dressing types, the application properties of which are highly divergent, without impairing their character and physical fastness properties. The wide spectrum of dressing types extends from hard and non-thermoplastic glazing dressings to extremely pliable dressings for milled nappa.

EXAMPLE 1

17.5 kg of glycol monoethyl ether and 17.5 kg of ethylene glycol are initially introduced into a V4A stainless steel stirred vessel, and the vessel is made air-free by flushing with pure nitrogen and heated with stirring to 90° C. A mixture of 8.75 kg of acrylic acid ethyl ester, 10.5 kg of methacrylic acid methyl ester, 7 kg of N-vinylpyrrolidone, 3.5 kg of acrylic acid, 5.25 kg of vinyl acetate, 0.35 kg of 2-mercaptoethanol and 0.7 kg of azodiisobutyrodinitrile is pumped in at this temperature in the course of 4 hours. The mixture is stirred for a further 2 hours at 90° C., and 70 kg of a 50% strength polymer solution, which is further processed as a pigment binder as follows, are obtained:

5 kg of the pigment binder are initially introduced together with 15.6 kg of water, 3 kg of ethylene glycol, 1 kg of 2-phosphonobutane-1,2,4-tricarboxylic acid and 1.5 kg of ammonia (25% strength technical grade).

After brief stirring 65 kg of titania pigment (BAYER-TITAN R-KB-4, Messrs Bayer), 0.2 kg of pyrogenic silica (Aerosil 380, Messrs Degussa) and 0.05 kg of a commercially available preservative (Proxel GXL, Messrs ICI) are added, and the mixture is stirred for 15 minutes at 200 rpm by means of a dissolver. The mixture is then diluted with 8.35 kg of water and defoamed with 0.4 kg of tri-n-butyl phosphate at 800 rpm. The finished pigment paste is readily dispersed, and has good flow and a long shelf life; pH value 9–9.5.

The pigment formulation can be used as follows to prepare white-pigmented polymer binder colours which are used for dressing leather:

(a) Pigmenting non-reactive aqueous polyacrylate and polybutadiene dispersions.

200 g of the pigment formulation are diluted with 400 g of water, and 250 g of a 40% strength polyacrylate binder, prepared using Example 1 of German Auslegeschrift No. 1,278,064, and 150 g of a 35% strength polybutadiene binder, prepared using Example 2 of German patent No. 1,174,937, are added to the dilution. After thorough mixing a highly covering white polymer binder colour is obtained which is particularly suitable for use as a spray colour on buffed and full-grain leathers. If the colour is to be applied by means of a plush-board, the colour is first diluted with water in a ratio of 2:1.

(b) Pigmenting crosslinkable aqueous polybutadiene dispersions.

German Offenlegungsschrift No. 2,946,435 describes a process for dressing leather, which is characterised in that, in dressing leather, caoutchouc latices which are not polymerised fully are reacted with oxides and/or hydroxides of divalent metals. Example 1 of German Offenlegungsschrift No. 2,946,435 is then followed and 100 g of the pigment formulation obtained above, according to the invention, are used for pigmenting instead of the 100 g of commercially available casein-based pigment paste used, and then further processed as described in Example 1 of German Offenlegungsschrift No. 2,946,435. The dressing obtained has the advantageous properties indicated in German Offenlegungsschrift No. 2,946,435. But, in addition, it has a greater hiding white and is less of a strain on the grain, its handle is markedly dryer, and it does not tend to tackiness as experienced on pigmenting with casein-containing pigment pastes.

The pigment formulation can be used as follows to prepare white-pigmented polyurethane dispersions which are used for coating textiles:

(c) Pigmenting crosslinkable aqueous polyurethane dispersions:

100 g of the titania pigment formulation and then 20 g of a 50% strength aqueous solution of a partially etherified melamine/formaldehyde precondensate are added with stirring by means of a low-speed gate stirrer to 1,000 g of a 40% strength aliphatic crosslinkable polyester urethane dispersion prepared using Example 3 of German Offenlegungsschrift No. 2,814,173, after 10 g of 10% strength acetic acid and 1 g of a defoamer (Nopco 8050, Messrs Münzing) have been added. 17 g of a copolymer of vinylpyrrolidone and vinyl acetate are then added in an evacuation stirred vessel to adjust the mixture to coating viscosity. After the mixture had been stirred for 5 minutes, a finely divided stable pigment dispersion is obtained which is suitable for coating textiles using the reverse method or direct method. The paste has a pH value of 6 and a viscosity of 4,300 mPa.s. The polyurethane films prepared with the pigment dispersion using known methods are dyed level and without spots. The crosslinking is effected after the final coat, in a heat treatment of the coated and dried goods for 90 seconds at 150° C.

EXAMPLE 2

The following monomer mixture is used as described in Example 1: 9.625 kg of acrylic acid isopropyl ester, 9.625 kg of methacrylic acid methyl ester, 5.25 kg of N-vinylpyrrolidone, 4.375 kg of acrylic acid and 6.125 kg of vinyl acetate.

20 kg of this pigment binder are initially introduced together with 30 kg of water, 5 kg of ethylene glycol and 3 kg of monoaminoethanol. After brief stirring 16 kg of carbon black having a particle size of 18 mu and a nigrometer index of 74 (Monach 800, Messrs Cabot) and 0.05 kg of a preservative (Proxel GXL, Messrs. ICI) are added and the mixture is stirred for 15 minutes at 2,000 rpm by means of a dissolver. The carbon black dispersion is then bead-milled 1-2 times using glass beads having a diameter of 1 mm until the necessary depth of black and colour have been obtained. The dispersion is then diluted in a stirred vessel with 25.55 kg of water and defoamed with 0.4 kg of tri-n-butyl phosphate. The finished pigment paste is readily dispersed and has good flow and a long shelf life; pH value 10-10.5.

The pigment formulation can be used as follows to prepare black-pigmented polymer binder colours which are used for dressing leather:

(a) Pigmenting crosslinkable aqueous polyacrylate and polybutadiene dispersions.

100 g of the carbon black formulation are thoroughly mixed with 40 g of a customary wax/oil emulsion and 15 g of a commercially available polyepoxide resin (LEKUTHERM X 20, Messrs Bayer) as a crosslinking agent, and the mixture is then diluted with 445 g of water. 250 g of a 40% strength acrylate-based carboxyl-containing Shore A film hardness of 45 and 150 g of a 35% strength butadiene-based carboxyl-containing copolymer with the Shore A film hardness of 63 are then added. On thorough mixing a black polymer binder colour is obtained which has great hiding power, spreads very readily and is particularly suitable for dressing buffed leathers. If colour application is effected by means of an air spray gun, the colour is used in the present form; if it is intended to apply the colour by means of plush-wheeling, the coloured liquor is first diluted with water in a ratio of 2:1; and if colour application is to be effected by means of a coating machine or an airless gun, the liquor is adjusted by means of a suitable thickener (EUKANOL paste M, Messrs Bayer) to a viscosity which corresponds to a 4 mm nozzle Ford cup flow time of 16-20 seconds. The dressing obtained has an excellent depth of black and very good physical fastness properties, in particular very good wet and dry rubbing fastness, cracking and adhesion properties.

The carbon black formulation is also very highly suitable for pigmenting aqueous casein solutions which are used for a glazing dressing on leather:

(b) Pigmenting aqueous casein solutions.

25 g of the carbon black formulation are stirred together with 5 g of Turkey Red oil and 200 g of a commercially available 15% strength casein solution which is suitable for a glazing dressing, and the mixture is diluted with 670 g of water. 100 g of a 5% strength aqueous solution of a black acid dyestuff, Acid Black 2, are then stirred into the mixture. The finished casein colour is particularly suitable for dressing chrome-tanned glace goat, as follows:

2 plush-wheel applications, drying, glazing, 1 plush-wheel application, fixing by means of a 10% strength aqueous formaldehyde solution, glazing, and finish-ironing on a Finiflex continuous ironing machine using a hot roll at 130°-150° C. The dressed leathers are fine-porous and have a flat and close grain. The dressing has a high gloss and a flowery and deep black.

EXAMPLE 3

5 kg of the pigment binder of Example 1 are initially introduced together with 50 kg of water, 5 kg of ethylene glycol, 1 kg of 2-phosphonobutane-1,2,4-tricarboxylic acid and 1.5 kg of ammonia (25% strength technical grade). After brief stirring, 30 kg of precipitated silica (BAYSIKAL KN, Messrs Bayer), 0.3 kg of pyrogenic silica (Aerosil 380, Messrs Degussa) and 0.05 kg of a preservative (Proxil GXL, Messrs. ICI) are added, and the mixture is stirred for 15 minutes at 2,000 rpm by means of a dissolver. The delustrant dispersion is then bead-milled once with cooling using glass beads having a diameter of 2 mm. In a stirred vessel, the mixture is then diluted with 6.95 kg of water and defoamed by means of 0.2 kg of tri-n-butyl phosphate. The finished delustrant paste is free-flowing and has a long shelf life. pH value: 9–9.5.

The delustring paste is highly suitable for preparing more or less strongly delustred polymer binder colours which are used for dressing leather. If, for example, 10–30 g of delustring paste are used in Examples 1–3 in the polymer binder colours, in addition to or partly or completely in place of the pigment formulations, leather dressings are obtained in an elegant silky gloss; if, in these examples, more than 50 g of delustring paste are used, strongly delustred dressings result. All leather dressings are smooth and without grey spots even at high availability of the delustring paste. This paste is also suitable for use as an anti-adhesive when tackiness problems occur in ironing and stacking leathers.

EXAMPLE 4

The following mixture of monomers is used for polymerisation, as described in Example 1:

7 kg of acrylic acid n-butyl ester, 12.25 kg of methacrylic acid methyl ester, 7 kg of N-vinylpyrrolidone, 2.625 kg of acrylic acid and 6.125 kg of vinyl acetate. The pigment binder obtained is further processed as follows:

5 kg of the pigment binder are initially introduced together with 20 kg of water, 5 kg of ethylene glycol, 1 kg of 2-phosphonobutane-1,2,4-tricarboxylic acid and 2 kg of ammonia (25% strength technical grade). After brief stirring, 55 kg of iron oxide pigment (BAYFEROX 3910, Messrs Bayer), 0.2 kg of pyrogenic silica (Aerosil 380, Messrs Degussa) and 0.05 kg of a preservative (Proxel GXL, Messrs ICI) are added, and the mixture is stirred for 15 minutes at 2,000 rpm by means of a dissolver. The pigment dispersion is then bead-milled 1–2 times with cooling using glass beads having a diameter of 1 mm until the necessary tinctorial strength and cover have been achieved. In a stirred vessel, the mixture is then diluted with 11.35 kg of water and defoamed by means of 0.4 kg of tri-n-butyl phosphate. The finished pigment paste is readily dispersed and free-flowing and has a long shelf life. The pH value is 9–9.5.

To obtain colour pastes of the same viscosity using other inorganic pigments, it is necessary to adjust the quantitative ratio of pigment:binder:water and additives to the particular pigment.

EXAMPLE 5

35 kg of the pigment binder of Example 1 are initially introduced together with 28 kg of water and 5.6 g of ammonia (25% strength technical grade). After brief stirring, 21 kg of a thioindigo pigment, 1 kg of tri-n-butyl phosphate and 0.1 kg of a preservative (Proxil GXL, Messrs ICI) are added, and the mixture is stirred for 15 minutes at 2,000 rpm by means of a dissolver. The pigment dispersion is then bead-milled 1–2 times with cooling using glass beads having a diameter of 1 mm until the necessary tinctorial strength has been obtained. The mixture is finally diluted in a stirred vessel with 9.3 kg of water. The finished pigment paste is readily dispersed and free-flowing and has a long shelf life; pH value: 9–9.5.

Equally good pigment formulations are obtained if other organic pigments are used in place of the thioindigo pigment. To obtain colour pastes of the same consistency, it is necessary as in the case of the inorganic pigments in Example 4 to adjust the quantitative ratio of pigment: binder:water and additive to the particular pigment.

These pigment formulations are highly suitable for preparing effect colours which are used for dressing leather. This is carried out as follows:

50 g of a pigment paste mixture having the shade desired and an average pigment content of 20% are diluted with 795 g of water and stirred into 200 g of a 40% acrylate-, butadiene- or polyurethane-based polymer binder and 15 g of a commercially available copolymer of butadiene and methacrylic acid. The effect colour is adjusted to pH 8 by means of 4 g of ammonia (25% strength technical grade) and to a viscosity of a 2 mm nozzle Ford cup flow time of 50–70 seconds. To obtain good adhesion of the effect colour to the polymer priming it is important that polymer binder or mixtures of the same type are used in the priming and in the effect colour. The colour is applied by means of an air spray gun in 1–3 machine passes. The colour effect achieved is distinguished by the fact that grain formation is as sharply defined as when organic dyestuff solutions are used, while the grain is not strained. In a subsequent application of finish using solutions of collodion lacquer or polyurethane lacquer there is no risk of colour swimming away and the effect being smudged as when the effect is obtained by means of pigment pastes formulated in solvents or by means of organic dyestuff solutions.

To pigment polymer binder colours (see application in Examples 1 and 2) or aqueous casein solutions (see application in Example 2) formulations of organic pigments are used either alone or combined with the titania pigment formulation described in Example 1 or with the delustring paste (Example 3) or also with the inorganic pigment formulations of Example 4. All colour pastes are readily miscible with one another without flocculation phenomena; fill-up spots, colour stripes or colour fluctuations in reverse coating accordingly do not occur. The shades tanned by means of the pigment formulations can be easily reproduced any time.

We claim:

1. A composition comprising a pigment or delustrant and a binder therefore which binder is a copolymer having an intrinsic viscosity ($\eta$) of 0.05–0.35 which copolymer is prepared by copolymerizing the following components:
   10–40% by weight of an acrylic acid ester having 1–12 C atoms in the alcohol chain,
   10–40% by weight of a methacrylic acid ester having 1–4 C atoms in the alcohol chain,
   10–30% by weight of N-vinylpyrrolidone,
   5–15% by weight of acrylic acid and
   10–20% by weight of a vinyl ester having 1–4 C atoms in the acid chain,
in an organic solvent which is miscible with water in the presence of a per-compound or an azo compound which donates free radicals at the polymerization temperature.

2. Formulations according to claim 1, characterised in that the copolymer has been prepared in the presence of 0.2–2.5% by weight of regulator and 0.3–5% by weight or per-compound or an azo compound which donates free radicals.

3. A composition according to claim 1, wherein the copolymerization is carried in the presence of a sulfur containing compound.

4. A compositon according to claim 3, wherein said sulfur containing compound is mercaptoethanol, dodecyl mercaptan or tert. dodecyl mercaptan.

* * * * *